(12) United States Patent
Wheeler

(10) Patent No.: US 7,538,959 B1
(45) Date of Patent: May 26, 2009

(54) STRESS DECOUPLING OPTIC MOUNT

(75) Inventor: Craig Wheeler, Santa Rosa, CA (US)

(73) Assignee: L-3 Communications Sonoma EO, Inc., Santa Rosa, CA (US)

( * ) Notice: Subject to any disclaimer, the term of this patent is extended or adjusted under 35 U.S.C. 154(b) by 239 days.

(21) Appl. No.: 11/382,456

(22) Filed: May 9, 2006

(51) Int. Cl.
*G02B 7/02* (2006.01)
(52) U.S. Cl. ....................... 359/819; 359/811
(58) Field of Classification Search ............. 359/811, 359/815–819, 827, 830
See application file for complete search history.

(56) References Cited

U.S. PATENT DOCUMENTS

| | | | |
|---|---|---|---|
| 5,036,339 | A | 7/1991 | Hediger |
| 5,986,827 | A | 11/1999 | Hale |
| 6,400,516 | B1 * | 6/2002 | Spinali ............... 359/819 |
| 7,116,500 | B2 * | 10/2006 | Murasato |
| 2002/0027725 | A1 * | 3/2002 | Schletterer ............ 359/811 |
| 2006/0209644 | A1 * | 9/2006 | Kimura et al. |
| 2006/0285100 | A1 * | 12/2006 | Hamatani |

* cited by examiner

*Primary Examiner*—Timothy J Thompson
(74) *Attorney, Agent, or Firm*—Pillsbury Winthrop Shaw Pittman LLP

(57) ABSTRACT

An optic mount and mounting technique according to the invention isolates the material properties of the optical element from the material properties of the structural element. According to one aspect, kinematically positioned, opposing flexures attach to the structural and/or optical elements in a way that isolates one side of the mount from the other side. As the temperature changes, the flexures attached to the structural and optical elements can move radially like hinges as the materials expand and contract. According to additional aspects, thin stabilizers can be included such as ribs that connect the end of each flexure to the ring perimeter. The geometry of the rib can allow for radial compliance of the flexure while keeping the flexure stiff in the axial direction. This increases the resonant frequency of the optical assembly, which is important for dynamic systems. The ribs also reduce positional sag due to gravity, which is important for optical systems that have dynamic pointing requirements.

22 Claims, 3 Drawing Sheets

STRESS DECOUPLING OPTIC MOUNT

FIELD OF THE INVENTION

The present invention relates to optical systems, and more particularly to low stress optical mounts and mounting techniques for optical systems.

BACKGROUND OF THE INVENTION

In mounts for optical systems, it is desirable to observe basic principles of kinematics. A body in space, such as a lens or mirror, has six degrees of freedom or ways in which it may move: translation along the three rectangular coordinate axes, and rotation about these three axes. A body is fully constrained when each of these possible movements is singly prevented from occurring. However, it is sometimes desirable in an optical system for some degrees of freedom to be allowed, and so semikinematic methods can be used.

Meanwhile, for optical systems which must withstand a difficult thermal and/or vibration environment, a conventional form of mount is achieved by oversizing the fit between a mount structure and the optical element and cementing the optical element in place with a relatively thick bond such as a compliant, elastomeric type of cement. This technique can be useful for large elements where the thermal expansion difference between the element and the mount is a serious problem, and the relatively thick bond allows for expansion and contraction that is accommodated by the compliant cement. Such a compliant and thick bond minimizes the stress that is induced on the optical element due to thermal expansion, which can thereby protect against degraded imaging performance.

An example is shown in FIGS. 1A and 1B which are top and side views, respectively, of an optical element 102 mounted in accordance with the prior art. Optical element 102 is, for example, a mirror in a Cassegrain mirror system for a telescope and is comprised of a material such as glass. As shown, element 102 is mounted to a structural element such as hub 104 with bonding material 106.

For applications where light weight is desired, hub 104 can be comprised of a material such as aluminum. This material has a different thermal expansion coefficient than glass, of which the optical element typically is comprised. To keep the stress low through the possible range of expansion of these mount and optical element materials, therefore, the bond material is comprised of an silicone rubber material such as Silastic E RTV, trademarked and available from Dow Corning, and needs to be relatively thick.

This technique for mounting optical elements suffers from several problems. For example, an optical system employing mounts using this technique can suffer from positional sag due to gravity. More specifically, the thickness and relative softness of an elastomer bond can not support the self weight of the optical element and thus, can not maintain the position of the optical element. Moreover, such mounts can suffer from poor thermal performance because elastomers like Silastic E RTV have a very high thermal expansion coefficient compared to metals and glass. Accordingly, for a thick bond having such a high thermal expansion, the motion over a large temperature range can be very significant. Relatedly, systems having such mounts exhibit a low resonant frequency resulting in motion of the optical element when subjected to external loads like a rotating helicopter blade or turbulence on a jet plane.

Accordingly, a need remains in the art for a low stress optical mount that does not suffer from problems afflicting the conventional approaches.

SUMMARY OF THE INVENTION

An optic mount and mounting technique according to the invention isolates the material properties of the optical element from the material properties of the structural element. According to one aspect, the mount includes kinematically positioned, opposing flexures that attach to the structural and/or optical elements in a way that isolates one side of the mount from the other side. As the temperature changes, the flexures attached to the structural and/or optical elements can move radially like hinges as the materials expand and contract. According to additional aspects, thin ribs connect the end of each flexure to the ring perimeter. The geometry of the rib can allow for radial compliance of the flexure while keeping the flexure stiff in the axial direction. This increases the resonant frequency of the optical assembly, which is important for dynamic systems. The ribs also reduce positional sag due to gravity, which is important for optical systems that have dynamic pointing requirements.

In furtherance of these and other objects, an optical system according to the invention includes a mount for mounting an optical element to a structural element including one or more flexures that isolate material properties of the optical element from material properties of the structural element. In certain embodiments, the mount is positioned between the optical element and the structural element, and the flexures include a first flexure that has a first end affixed to the mount and a second end affixed to the optical element, wherein the second end of the first flexure is capable of flexing away from the mount. In these and other embodiments, the flexures can further or alternatively include a second flexure that has a first end affixed to the mount and a second end affixed to the structural element, wherein the second end of the second flexure is capable of flexing away from the mount.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to certain general aspects, an optic mount according to the invention isolates the material properties of the optical element from the material properties of the structural element. Rather than employing an oversized fit and a compliant cement, the mount is a structure positioned between an optical element and a structural element that includes rigid portions to provide kinematic stability in desired directional components, and flexible portions attached to the optical element and/or structural element that accommodate expansion and contraction between the optical element and structural element, for example during changing environmental conditions such as temperature changes.

Figures 1A, 1B:
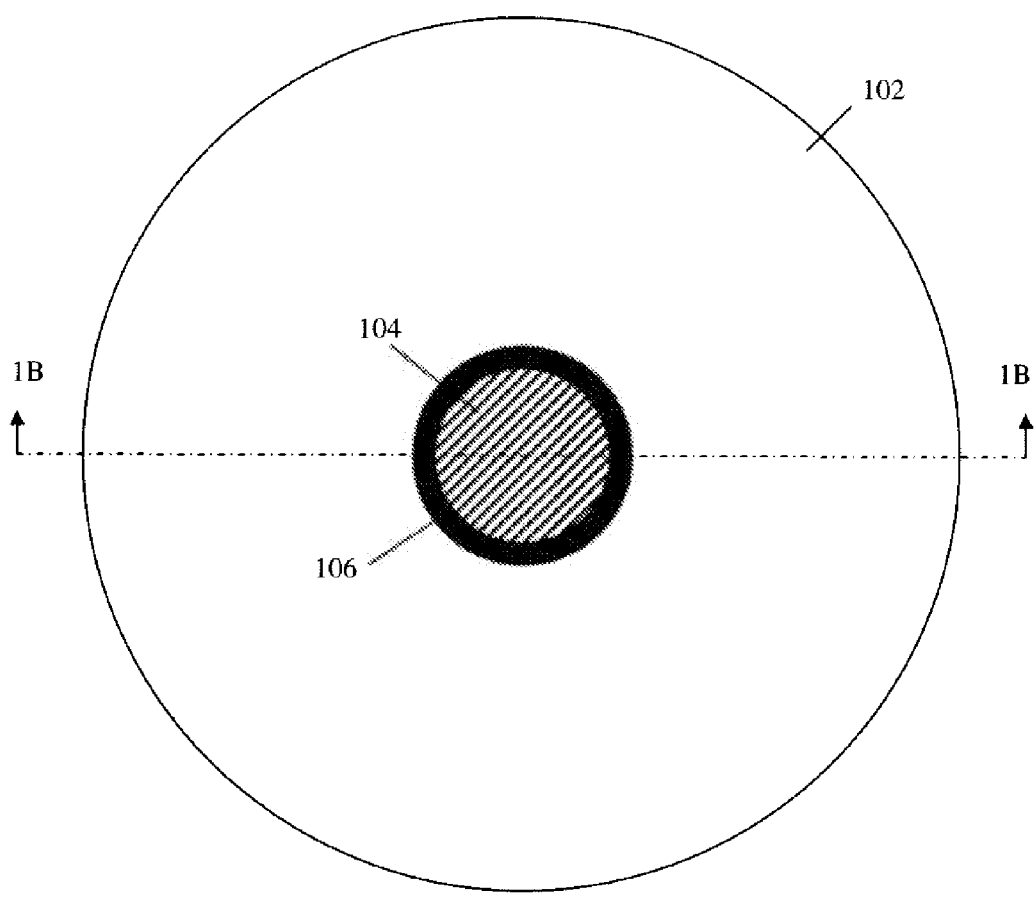
FIGS. 1A and 1B are different views of an optical system employing conventional mounting techniques.
Figure 2:
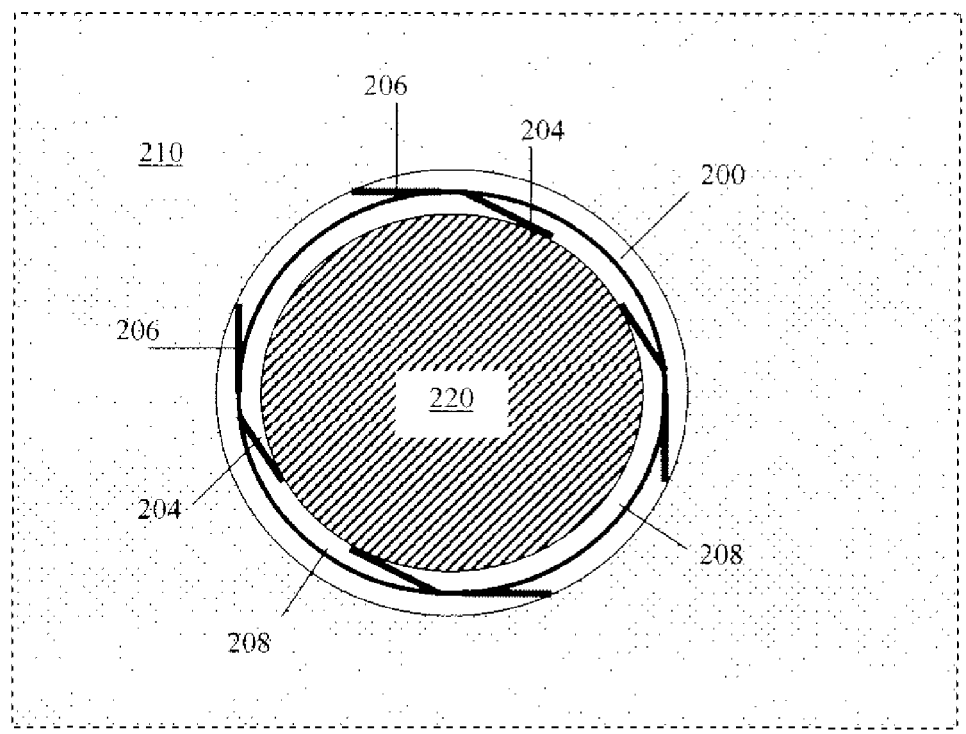
FIG. 2 illustrates one example technique and structure for mounting an optical element to a structural element in accordance with the invention.

A mounting technique and structure according to certain aspects of the invention is illustrated in FIG. 2. It should be noted that the invention is not limited to this example implementation of a mounting structure and/or optical element having a circular shape, but that other shapes and implementations are possible.

As shown in FIG. 2, a mounting ring 200 is interposed between an optical element 210 and a structural element 220. More particularly, in this example, the ring 200 has a diameter that is between an inner diameter of the optical element 210 and an outer diameter of the structural element 220. The ring includes inward flexures 204 and outward flexures 206 that respectively attach to the structural element 220 and optical element 210. The flexures 204 and 206 can deflect inward and outward from the ring, respectively, in a radial direction like hinges. This radial deflection can occur as the material of either or both of the structural element and optical element expand and contract, thus decoupling the respective material properties of the structural element and the optical element during various environmental changes such as temperature changes. Meanwhile, rigid portions 208 of the ring 200 preferably do not flex and provide kinematic stability in desired directions, as will be explained in more detail below.

It should be noted that the drawing in FIG. 2 is not necessarily to scale, and the radial deflection of flexures 204 and 206 has been emphasized to clarify certain aspects of the invention. Those skilled in the art will understand that the actual radial deflection may be considerably less while still providing the benefits mentioned herein, and in certain cases may even be otherwise imperceptible to the human eye.

In one example implementation, the ring 200 has a thickness of about 2 mm, a width of about 19 mm and a diameter of about 100 mm. To achieve the lowest stress on the optical element, the coefficient of thermal expansion of the optical element 210 material and the ring 200 material are preferably close in value. Meanwhile, a high modulus of elasticity for the ring 200 material is desirable for both stiffness and dynamic response. In an example implementation where the optical element 210 material is glass, stainless steel has been found to be a suitable material for ring 200.

Flexures 204 and 206 are attached to structures 220 and 210, respectively, using an adhesive such as OP-29 from Dymax Corp. of Torrington, Conn. A ring 200 in this example implementation can be included in an optical system wherein optical element 210 is comprised of glass and has a weight of about 10 lbs., and wherein structural element 220 is comprised of aluminum. In this embodiment, the flexures 204 and 206 may accommodate up to approximately 0.35 mm of radial deflection from ring 200 in temperature ranges from about −55 degrees C. to 75 degrees C., which is sufficient given the difference in thermal expansion coefficients of glass and aluminum. Those skilled in the art will be able to practice the invention using other materials after being taught by these examples.

The above example implementation can be used in an optical system including an optical element that is a Cassegrain mirror for a telescope mounted to a hub as the structural element. Such an optical system can be included in the payload of a gimbal or other sensor system. Such systems can be subject to extreme environmental and vibrational conditions, and for which the present invention provides superior performance to conventional mounting techniques. However, the invention is not limited to this example application, and an analysis for modifying this example for various applications will be described below.

It should be apparent that different dimensions and materials can be used for ring 200 and flexures 204 and 206 based on the particular application, and those skilled in the art will be able to practice the invention in such applications after being taught by the examples provided herein. It should be further apparent that the actual number, size and shape of flexures used in a particular application can also be designed for a given application based on the present teachings. It should be noted, moreover, that it is not necessary for there to be the same number of inward and outward flexures, nor that they be placed in the manner shown in the figure. The invention may be practiced in various ways using various types and configurations of flexures.

It should also be noted that, in certain embodiments, flexures need only be attached to one of the optical element or structural element, whereas rigid portions of the ring may be directly attached to and/or integrally formed in the other element. Those skilled in the art will be able to practice such embodiments after being taught by the present disclosure.

Figure 3:
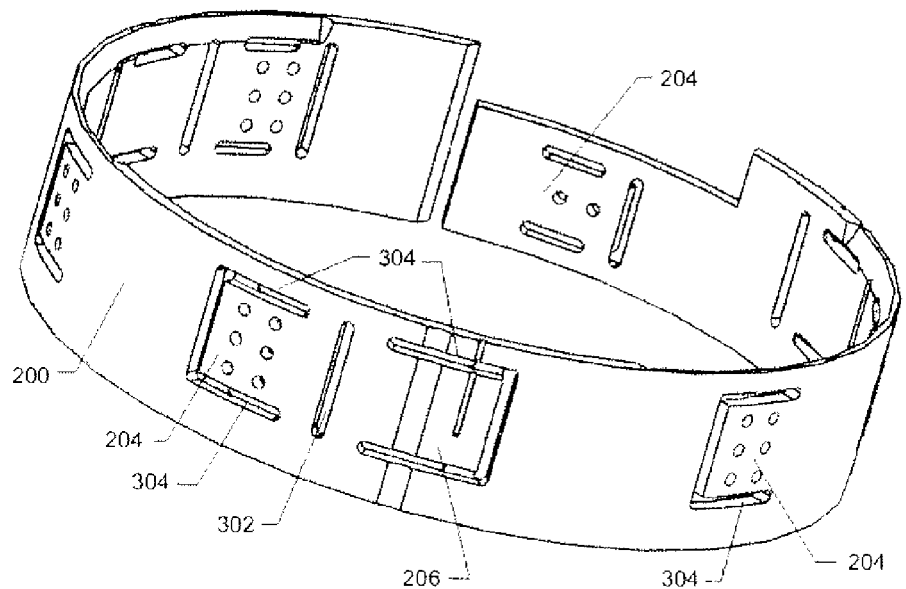
FIG. 3 illustrates a mounting ring and flexures such as that used in the technique and structure in FIG. 2 in further detail.

FIG. 3 illustrates certain aspects of a ring 200 according to some example implementations of the invention in more detail.

As shown in FIG. 3, certain of flexures 204 and 206 are positioned together on opposing sides of a decoupler 302 so as to isolate stresses occurring on the ring 200 due to deflection of a flexure on one side of the decoupler 302 from the other side. As can be seen in FIG. 3, certain other of flexures 204 and 206 need not be positioned opposite other of flexures 204 and 206 with respect to decoupler 302.

In one example implementation of a ring 200 having dimensions and characteristics described above, flexures 204 are about 12 mm long and 12 mm wide, while flexures 206 are about 19 mm long and 12 mm wide. As further shown in FIG. 3, flexures 204 and 206 are defined by 1.6 mm wide cuts 304 completely through ring 200 (except, in some embodiments, for rib portions which will be described in more detail below). Where opposing flexures 204 and 206 are positioned opposite a decoupler 302, the decoupler is defined by a 1.6 mm wide cut completely through ring 200, and centered in a 4 mm separation between the opposing flexures 204 and 206.

Flexures 204 and 206 are preferably positioned so as to distribute the loads as equally as possible around the ring 200. Accordingly, in this illustrated example, three opposing pairs of flexures 204, 206 are therefore symmetrically positioned approximately 120 degrees apart on ring 200.

Figure 4:
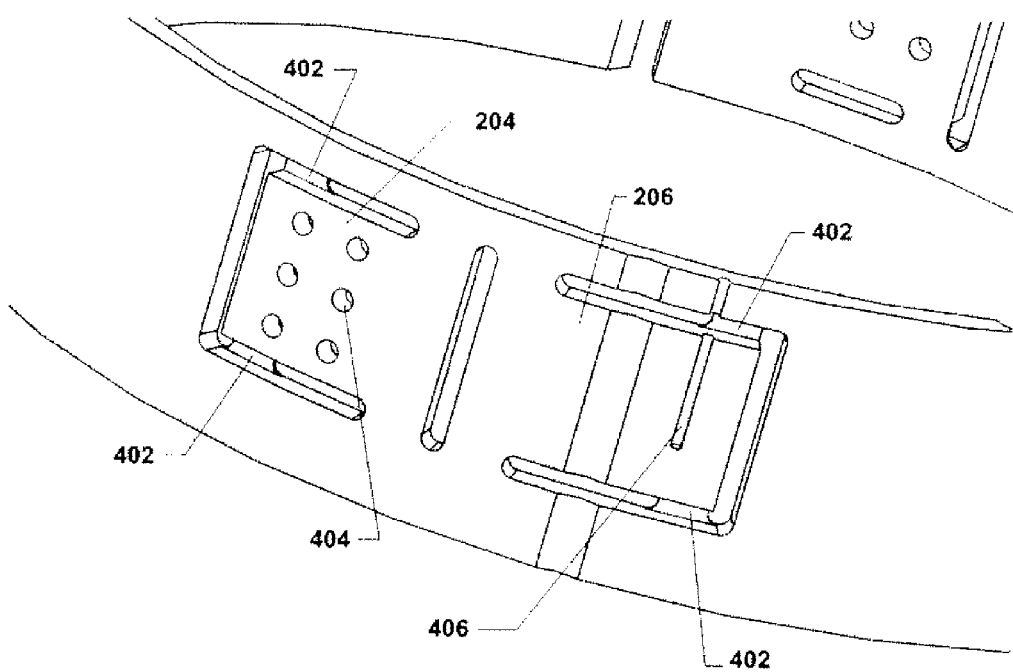
FIG. 4 illustrates flexures such as those used in the technique and structure in FIG. 3 in further detail.

FIG. 4 illustrates certain kinematic and other aspects of flexures 204, 206 in accordance with some example implementations of the invention in more detail.

According to the example shown in FIG. 4, thin stabilizers or ribs 402 are positioned in the cut defining the flexures 204, 206 and connect an end of the flexures to the ring perimeter. In one example implementation, ribs 402 are about 0.25 mm thick, and about 3 mm wide. The illustrated geometry of the ribs allows for radial compliance of the associated flexure while keeping the flexure stiff in the axial direction (i.e. orthogonal to the direction of radial compliance).

It should be noted that it is not necessary for all of both inward and outward flexures 204, 206 to have ribs 402 as shown in FIG. 4, but that it is possible only certain flexures 204, 206 have them, and/or only flexures 204 or 206 include them. As further shown in FIG. 4, inward flexures 204 include holes 404, and outward flexure 206 includes trough 406. These holes and trough can be used to inject adhesive during mounting of optical element 210 to mounting structure 220.

According to one aspect of the invention, the geometry of the ribs increases the resonant frequency of the optical assembly, which can be desirable for certain applications. More particularly, without ribs 402, the flexures 204, 206 could flex more both radially and axially. However, since the flexures are relatively thick radially, they are relatively stiff or resistant to motion in the radial direction. Meanwhile, the flexures 204, 206 are also long enough to provide sufficient radial deflection, and thereby keep low any stresses due to thermal expansion coefficient differences between materials in 210 and 220. To keep such stresses as low as possible (which is desirable for optical performance), but to increase the resonant frequency of the system, the ribs 402 are added. With the dimensions and geometry as illustrated and described, the ribs still permit compliance of flexures 204, 206 in the radial direction (albeit with some additional stiffness and associated stress), but further restrain motion in the axial direction, which improves the resonant frequency. The resultant increase in resonant frequency of the system is important for dynamic systems. The ribs also reduce positional sag due to gravity, which is important for optical systems that have dynamic pointing requirements.

It should be noted that various modifications to the shapes and dimensions of the elements in the above examples can be designed using finite element analysis and/or empirical analyses after being taught by the present disclosure. Additionally or alternatively, the dimensions, shapes, use/non-use of ribs could be designed using a trade-off analysis that balances desired performances of stress, kinematics, gravity sag, and modal response to determine the optimized shape of the flexures, use and dimensions of stiffening ribs, etc.

In general, for a static system where dynamics are not important, minimized stress on the optics and minimized gravity sag would be the most important considerations. For a dynamic system, minimizing stress and maximizing resonant frequency are opposing performance parameters. Usually, increasing resonant frequency will make the bond stiffer and result in more stress in the bond and thus the optical element. Minimizing stress usually means a more flexible flexure or a thicker bond. Both of these will reduce resonant frequency. Accordingly, those skilled in the art can perform a trade-off analysis that considers such factors and obtain the optimal set of flexures, ribs, dimensions and shapes for a given application.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. An optical system comprising:
   a mount for mounting an optical element to a structural element including one or more flexures that isolate material properties of the optical element from material properties of the structural element,
   wherein the mount is positioned between the optical element and the structural element, and wherein the flexures include:
   a first flexure that has a first end affixed to the mount and a second end affixed to the optical element, wherein the second end of the first flexure is capable of flexing away from the mount in a first direction; and
   a second flexure that has a first end affixed to the mount and a second end affixed to the structural element, wherein the second end of the second flexure is capable of flexing away from the mount in a second direction opposite the first direction.

2. An optical system according to claim 1, further comprising a decoupler between the first ends of the first and second flexures.

3. An optical system according to claim 2, wherein the decoupler is defined by a cut through the mount.

4. An optical system according to claim 1, further comprising a stabilizer coupled between the first flexure and the mount that provides stability of the optical element in a third direction different than the first and second directions of the flexing.

5. An optical system according to claim 4, wherein the first flexure is defined by a cut through the mount, and the stabilizer is positioned in the cut.

6. An optical system comprising:
   a mount for mounting an optical element to a structural element including one or more flexures that isolate material properties of the optical element from material properties of the structural element,
   wherein the mount is positioned between the optical element and the structural element, and wherein the flexures include a first flexure that has a first end affixed to the mount and a second end affixed to the structural element, and wherein the second end of the first flexure is capable of flexing away from the mount,
   and wherein the optical system further comprises a stabilizer coupled between the first flexure and the mount that provides stability of the optical element in a first direction different than a second direction of the flexing.

7. An optical system according to claim 6, wherein the first flexure is defined by a cut through the mount, and the stabilizer is positioned in the cut.

8. An optical system according to claim 1, wherein the mount further includes rigid portions that provide stability of the optical element in a third direction different than the first and second directions of flexing provided by the flexures.

9. An optical system according to claim 8, wherein the structural element has an outer perimeter and the optical element has an inner perimeter, and the mount has a mount perimeter between the outer perimeter and the inner perimeter.

10. An optical system comprising:
   an optical element having a first thermal expansion coefficient;
   a structural element having a second thermal expansion coefficient different than the first thermal expansion coefficient; and
   a mount for mounting the optical element to the structural element including one or more flexures that flex to accommodate relative expansion of the optical element and structural element in a given temperature range due to the different first and second thermal expansion coefficients, wherein the flexures include a first flexure that has a first end affixed to the mount and a second end affixed to the structural element, and wherein the second end of the first flexure is capable of flexing away from the mount.

11. An optical system according to claim 10, wherein the flexures include a first flexure that has a first end affixed to the mount and a second end affixed to the optical element, and wherein the second end of the first flexure is capable of flexing away from the mount.

12. An optical system comprising:
   an optical element having a first thermal expansion coefficient;
   a structural element having a second thermal expansion coefficient different than the first thermal expansion coefficient; and
   a mount for mounting the optical element to the structural element including one or more flexures that flex to accommodate relative expansion of the optical element and structural element in a given temperature range due to the different first and second thermal expansion coefficients,
   wherein the flexures include:
   a first flexure that has a first end affixed to the mount and a second end affixed to the optical element, wherein the second end of the first flexure is capable of flexing away from the mount in a first direction; and
   a second flexure that has a first end affixed to the mount and a second end affixed to the structural element, wherein the second end of the first flexure is capable of flexing away from the mount in a second direction opposite the first direction.

13. An optical system according to claim 12, further comprising a decoupler between the first ends of the first and second flexures.

14. An optical system according to claim 11, further comprising a stabilizer coupled between the first flexure and the mount that provides stability of the optical element in a first direction different than a second direction of the flexing.

15. An optical system according to claim 14, wherein the first flexure is defined by a cut through the mount, and the stabilizer is positioned in the cut.

16. An optical system according to claim 10, further comprising a stabilizer coupled between the first flexure and the mount that provides stability of the optical element in a first direction different than a second direction of the flexing.

17. An optical system according to claim 16, wherein the first flexure is defined by a cut through the mount, and the stabilizer is positioned in the cut.

18. A method comprising:
   identifying an optical element having a first thermal expansion coefficient;
   identifying a structural element having a second thermal expansion coefficient different than the first thermal expansion coefficient;
   preparing a mount for mounting the optical element to the structural element including providing one or more flexures in the mount that can flex to accommodate relative expansion of the optical element and structural element in a given temperature range due to the different first and second thermal expansion coefficients; and
   coupling a stabilizer structure to the flexure in accordance with a desired reduction of positional sag.

19. A method comprising:
   identifying an optical element having a first thermal expansion coefficient;
   identifying a structural element having a second thermal expansion coefficient different than the first thermal expansion coefficient;
   preparing a mount for mounting the optical element to the structural element including providing one or more flexures in the mount that can flex to accommodate relative expansion of the optical element and structural element in a given temperature range due to the different first and second thermal expansion coefficients; and
   coupling a stabilizer structure to the flexure in accordance with a desired increase of resonant frequency.

20. An optical system according to claim 10, wherein the optical element weighs at least approximately ten pounds.

21. An optical system according to claim 20, wherein the thermal expansion is in a radial direction of the optical element, and wherein the mount includes ribs that provide mechanical stiffness in directions other than the radial direction.

22. An optical system according to claim 18, wherein the thermal expansion is in a radial direction of the optical element, and wherein the preparing step further includes preparing ribs in the mount that provide mechanical stiffness in directions other than the radial direction.

* * * * *